United States Patent
Saitou (10) Patent No.: US 7,536,086 B2
(45) Date of Patent: May 19, 2009

(54) VIDEO PLAYBACK APPARATUS AND DISPLAY CONTROL METHOD

(75) Inventor: Katsuya Saitou, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 934 days.

(21) Appl. No.: 10/744,054

(22) Filed: Dec. 22, 2003

(65) Prior Publication Data

US 2004/0190879 A1 Sep. 30, 2004

(30) Foreign Application Priority Data

Dec. 27, 2002 (JP) ............................. 2002-378805

(51) Int. Cl.
*H04N 7/06* (2006.01)
*H04N 7/08* (2006.01)
*H04N 5/91* (2006.01)

(52) U.S. Cl. .............................. 386/96; 386/95; 386/46

(58) Field of Classification Search ..................... 386/1, 386/46, 52, 96, 111, 112, 125–126, 95, 11; 725/46, 50

See application file for complete search history.

(56) References Cited

U.S. PATENT DOCUMENTS

| | | | |
|---|---|---|---|
| 5,559,549 A * | 9/1996 | Hendricks et al. | 725/50 |
| 6,246,401 B1 * | 6/2001 | Setogawa et al. | 715/723 |
| 6,567,609 B2 | 5/2003 | Mori et al. | |
| 2002/0154888 A1* | 10/2002 | Allen et al. | 386/46 |
| 2002/0174430 A1* | 11/2002 | Ellis et al. | 725/46 |

FOREIGN PATENT DOCUMENTS

| | | |
|---|---|---|
| JP | 08-87823 | 4/1996 |
| JP | 2002-230891 | 8/2002 |

* cited by examiner

*Primary Examiner*—Thai Tran
*Assistant Examiner*—Michael Choi
(74) *Attorney, Agent, or Firm*—Brinks Hofer Giilson & Lione (57) ABSTRACT

In a video playback apparatus, it is determined whether or not a current screen is a menu screen on the basis of signals recorded on a recording medium while the display of a display unit is turned off by a display-off setting made by a user. When the current screen is determined to be the menu screen, the display is turned on so that the menu screen appears. Then, when the current screen is no longer the menu screen, the display is turned off.

18 Claims, 14 Drawing Sheets

| CLASSIFICATION | DOMAIN | MAIN FUNCTION |
|---|---|---|
| TITLE MENU | VMGM_DOM | SELECT TITLE AND START PLAYBACK |
| ROUTE MENU | VTSM_DOM | FUNCTION IS SET BY PROVIDER. MUST HAVE LINK FUNCTION TO FOUR MENUS BELOW WHEN THEY ARE PROVIDED |
| AUDIO MENU | VTSM_DOM | SELECT AUDIO STREAM |
| SUBPICTURE MENU | VTSM_DOM | SELECT SUBPICTURE STREAM |
| ANGLE MENU | VTSM_DOM | SELECT ANGLE NO. |
| PTT MENU | VTSM_DOM | SELECT PTT NO. AND START PLAYBACK |

FIG. 8

| | | |
|---|---|---|
| PGC_GI (Program Chain General Information) — 31 | | |
| PGC_CMDT (Program Chain Command Table) | | |
| PGC_PGMAP (Program Chain Program Map) — 32 | | |
| C_PBIT (Cell Playback Information Table) | | |
| C_POSIT (Cell Position Information Table) | | |

| | PGC_CNT (PGC Contents) | CONTENTS OF PGC |
|---|---|---|
| | PGC_PB_TM (PGC Playback time) | TOTAL PLAYBACK TIME OF PROGRAMS IN PGC |
| | PGC_UOP_CTL (PGC User Operation Control) | USER OPERATION PROHIBITED DURING PLAYBACK OF PGC |
| | PGC_AST_CTLT (PGC Audio Stream CTL Table) | STATE OF AUDIO STREAM AND INFORMATION CONVERTED INTO DECODING AUDIO STREAM NO. |
| | PGC_SPST_CTLT (PGC Sub Picture Stream CTL Table) | STATE OF SUBPICTURE STREAM AND INFORMATION CONVERTED INTO DECODING SUBPICTURE STREAM NO. |
| | PGC_NV_CTL (PGC Navigation CTL) | NO. OF PGC TO BE PLAYED BACK NEXT |
| | PGC_SP_PLT (PGC SP Palette) | COLOR INFORMATION USED IN ALL OF SUBPICTURE STREAMS IN PGC |
| | PGC_CMDT_SA (Start Address of PGC CMDT) | HEAD ADDRESS OF PGC_CMDT |
| | PGC_PGMAP_SA | HEAD ADDRESS OF PGC_PGMAP |
| | C_PBIT_SA | HEAD ADDRESS OF C_PBIT_SA |
| | C_POSIT_SA | HEAD ADDRESS OF C_POSIT_SA |

| HLI_GI |
|---|

| HLI_SS | STATE OF HLI IN PCI |
|---|---|
| HLI_S_PTM | HIGHLIGHT START TIME WHEN HLI IS ENABLED |
| HLI_E_PTM | HIGHLIGHT END TIME WHEN HLI IS DISABLED |
| BTN_SL_E_PTM | END TIME OF BUTTON SELECTION INTERVAL |
| BTN_MD | BUTTON CLASSIFICATION AND DISPLAY TYPE OF SUBPICTURE FOR EACH BUTTON GROUP |
| BTN_OFN | BUTTON OFFSET NO. FOR USER BUTTON NO. |
| BTN_Ns | NO. OF ENABLED BUTTONS IN BUTTON GROUPS |
| NSL_BTN_Ns | NO. OF SELECTABLE USER BUTTONS |
| FOSL_BTNN | BUTTON NO. FORCEDLY SELECTED AT HLI_S_PTM |
| FOAC_BTNN | BUTTON NO. FORCEDLY ACTIVATED AT HLI_SL_E_PTM |

VIDEO PLAYBACK APPARATUS AND DISPLAY CONTROL METHOD

BACKGROUND OF THE INVENTION

1. Field of the Invention

The present invention relates to video playback apparatuses and display control methods, and more specifically relates to a video playback apparatus and a display control method in which the display is turned on only when necessary and is otherwise turned off.

2. Description of the Related Art

When a display device is turned on while music recorded on a disc, such as a compact disc (CD), is being played back, a high-frequency digital signal from a central processing unit (CPU) which controls the display of the display device is superimposed on an audio signal path. Therefore, the signal-to-noise (S/N) ratio of the audio signal decreases and the sound quality degrades. Accordingly, Japanese Examined Patent Application Publication No. 6-105532 discloses a disc player which includes a switch for stopping the operation of a display device while the music is being played back and which turns off the display during playback so as to prevent noise. In acoustic devices, such a function to improve the sound quality by turning off the display while sound is being played back by an audio signal is called a "blackout" function (function to turn off the display).

If a recording medium such as a CD is not such that an operation menu is to be displayed, continuous playback or the like is not affected even when a display function (or circuit for the display) is turned off. Accordingly, there is no problem in enabling the blackout function as necessary and turning off the display while the music is being played back. For example, when a user wishes to listen to the music with a high sound quality, the blackout function can be enabled and the display can be turned off. In addition, when a user wishes to only listen to the music from a DVD-Video disc of a live performance like listening to a CD since he or she has already seen the video enough, the blackout function can also be enabled and the display can be turned off.

On the other hand, in some DVD-Video discs, a menu screen is displayed first when playback thereof is started by a player, and playback does not start unless a certain menu is selected. Menus shown on the menu screen are, for example, a title menu for selecting a title and starting playback, an audio stream (audio track) selection menu, a subpicture selection menu, a menu for selecting the angle from which a video is to be played back, etc.

In the case in which the recording medium is such that the above-described menu screen is to be displayed, if the blackout function is activated and the display is turned off, the menu screen cannot be displayed and menu selection cannot be performed. Accordingly, playback cannot be started. In addition, since the menu screen is shown not only in the beginning but also in the middle of playback, the display cannot be controlled such that it is turned on only in the beginning and turned off afterwards.

Therefore, in discs such as DVD-Video/DVD-Audio discs which display the menu screen (playback does not start unless selection is performed) and start playback after receiving an operation command corresponding to the selected menu, there is a problem in that the user cannot perform menu selection and the following operations cannot be performed if the display function is simply turned off.

SUMMARY OF THE INVENTION

Accordingly, an object of the present invention is to provide a technique for automatically turning on the display when a menu screen is to be displayed so that the operation to be performed next can be selected and otherwise turning off the display to improve the sound quality.

Another object of the present invention is to provide a technique for detecting a data portion in which playback does not start unless some kind of operation is performed, on the basis of recording signals stored in a recording medium such as a disc and disabling the "blackout" function using the detection result as a trigger.

In order to attain the above-described objects, in a video playback apparatus according to the present invention which plays back audio and video on the basis of signals recorded on a recording medium, it is determined whether or not a current screen is a menu screen on the basis of the signals recorded on the recording medium while the display of a display unit is turned off by a display-off setting made by a user and the display of the display unit is turned on so that the menu screen appears when the current screen is determined to be the menu screen.

In addition, in order to attain the above-described objects, according to the present invention, the display of the display unit is turned off when the current screen is no longer the menu screen.

According to the present invention, the sound quality can be improved by turning off the display using the blackout function, and the display can be automatically turned on so that the menu screen appears when a menu-selection operation is required. Accordingly, the user can perform menu selection and playback can continue. In addition, after menu selection is performed by the user, the display can be turned off again and the sound quality can be improved.

In addition, recently, DVD-Video discs of live performances by musicians have been commonly sold, and the present invention is effective when a user wishes to only listen to the sound like listening to a CD or a DVD-Audio since he or she has already seen the video enough.

DESCRIPTION OF THE PREFERRED EMBODIMENTS

A) General Description of the Invention

Figure 1:
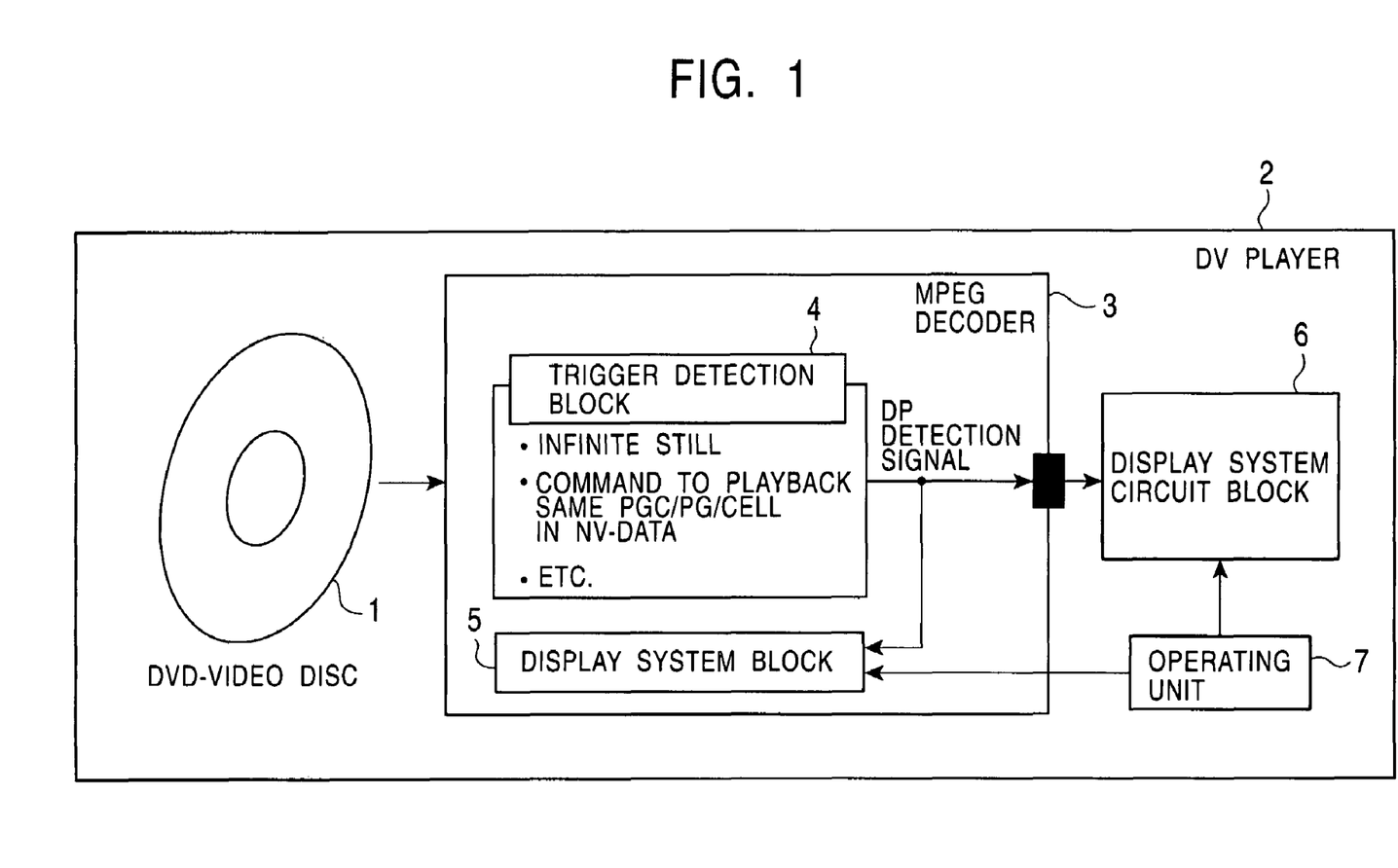
FIG. 1 is a schematic diagram showing the general construction of the present invention.

FIG. 1 is a schematic diagram showing the general construction of the present invention. According to the present invention, a data portion DP in which playback does not start unless some kind of operation is performed is detected. In other words, it is determined whether or not a current screen is a menu screen, and the "blackout" function is achieved by using the result of the determination as a trigger.

The data portion DP in which playback does not start unless some kind of operation is performed is recorded on a DVD-Video disc 1. A DVD player 2 includes an MPEG decoder 3 having a trigger detection block 4 which detects the data portion DP recorded on the DVD-Video disc 1 and transmits a DP detection signal to a display system block 5 included in the MPEG decoder 3 and an external display system circuit block 6. An operating unit 7 has keys for enabling the blackout function and supplies a signal indicating whether or not the blackout function is enabled to the blocks 5 and 6.

When the blackout function is enabled by the operating unit 7, the display system block 5 and the external display system circuit block 6 turn off the display when the level of the DP detection signal is low, that is, when the data portion DP is not detected, and turn on the display and display the menu screen when the level of the DP detection signal is high, that is, when the data portion DP is detected. Then, when menu selection is performed and playback is commanded, the display is turned off.

B) Construction of DVD-Video Disc

The construction of the DVD-Video disc will be described below before explaining a method for detecting the data portion DP in which playback does not start unless some kind of operation is performed.

(1) Navigation Data and Presentation Data

A typical DVD-Video player plays back DVD-Video discs which store data coded in accordance with the DVD-Video standard. The DVD-Video disc can store up to 99 titles, and video information taken from different angles, audio information of a plurality of (for example, eight) languages, and subpictures (captions or the like) of a plurality of languages are recorded for each title. A certain video, audio in a certain language, and a subpicture in a certain language are played back in accordance with commands from a user.

Data recorded on the DVD-Video disc can be broadly divided into two types: navigation data and presentation data. The navigation data is a general name for playback control data, and the presentation data is a general name for data of the video, the audio, and the subpicture to be played back. In the DVD-Video player, operations commanded by the user are title selection, menu selection, audio change, angle change, subpicture (caption) change, etc. The DVD-Video player searches for the presentation data (the video, the audio, and the subpicture) corresponding to the commands from the user by referring to the navigation data and plays back the presentation data.

(2) Volume Structure of DVD-Video Disc

Figure 2:
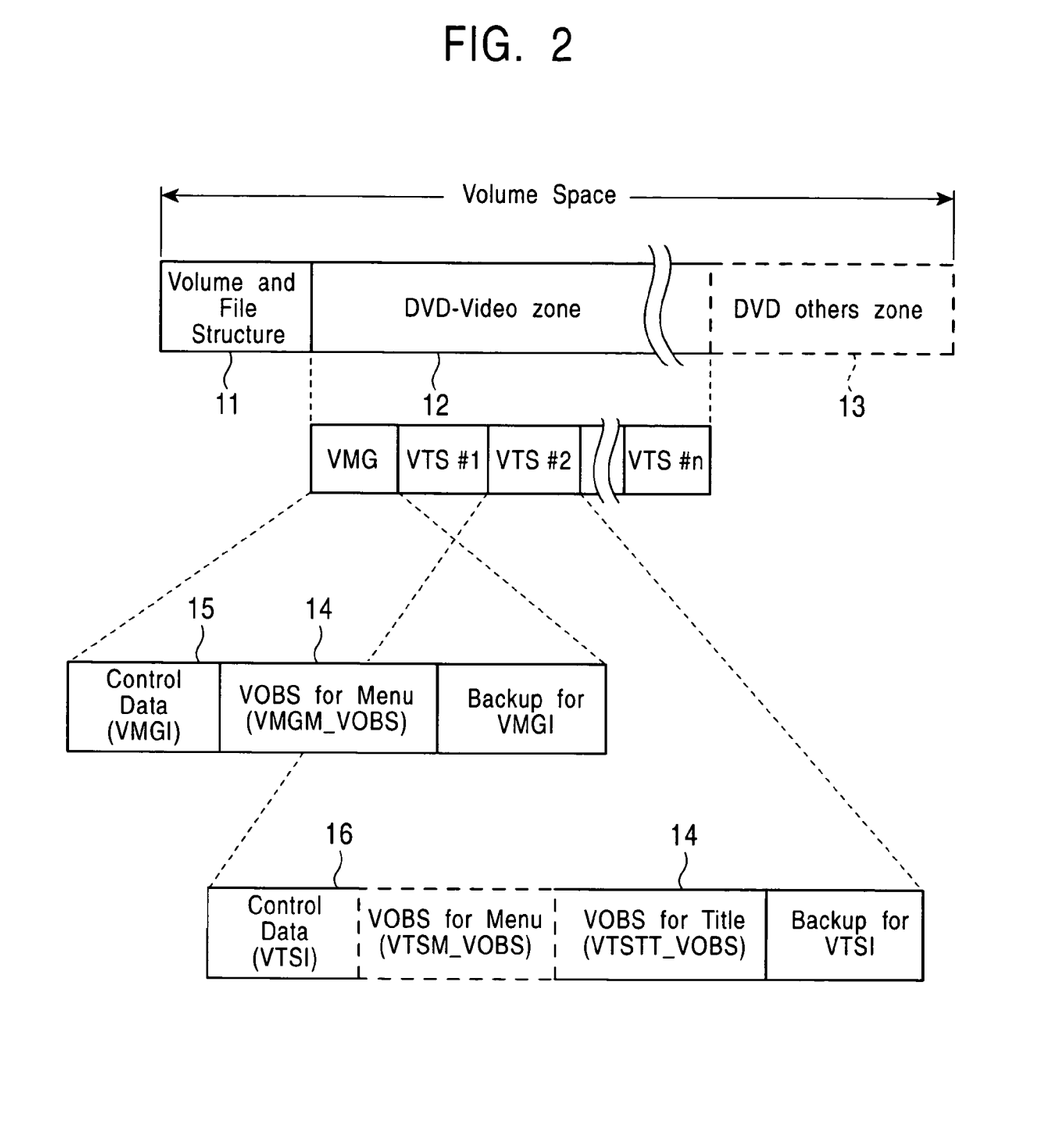
FIG. 2 is a schematic diagram showing the volume structure of a DVD-Video disc.

FIG. 2 is a schematic diagram showing the volume structure of the DVD-Video disc. The DVD-Video disc includes a volume/file structure unit 11, a DVD-Video zone 12, and an application zone 13 for applications other than the DVD-Video. The DVD-Video zone 12 stores: (a) a video manager (VMG) and (b) up to 99 video title sets (VTS #1 to VTS #99).

The video manager (VMG) covers all of the video title sets (VTSs) and includes VMG information (VMGI) 15 for supporting playback of the titles and user operations and a video object set (VMGM_VOBS) 14 for supporting volume access.

Each video title set (VTS #j) includes: (a) control data called VTS information (VTSI) 16; (b) a video object set for a VTS menu (VTSM_VOBS); and (c) a video object set for a VTS title (main program) (VTSTT_VOBS).

Figure 3:
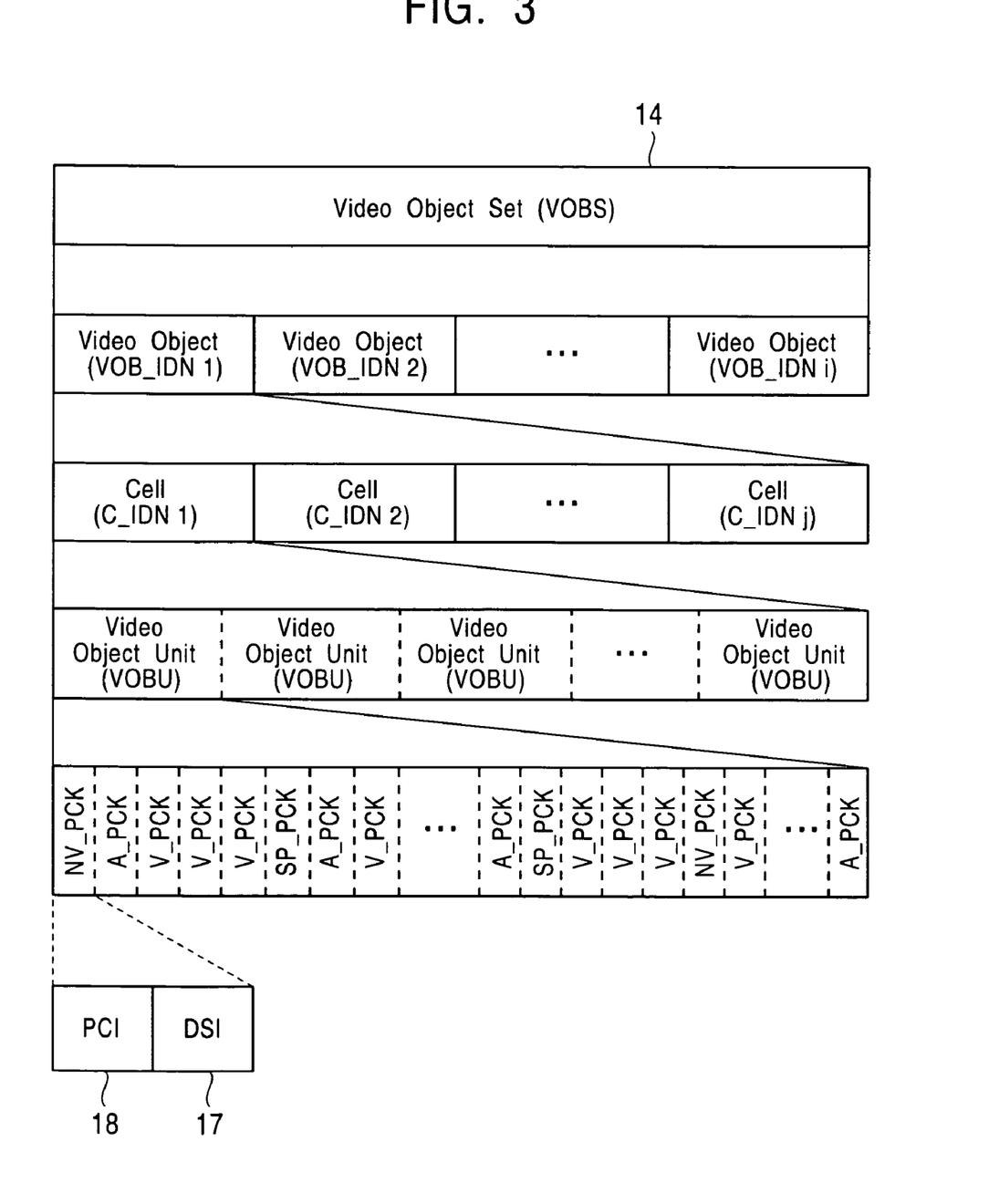
FIG. 3 is a diagram showing the structure of a video object set (VOBS)

FIG. 3 is a diagram showing the structure of the video object set (VOBS) 14. The video object set (VOBS) 14 includes many video objects (VOB_IDNi) (IDNi is an index for the $i^{th}$ VOB). Each video object (VOB) includes many cells, and each cell includes many video object units (VOBUs). In addition, each video object unit (VOBU) includes: (a) one navigation pack (NV_PCK); (b) a plurality of audio packs (A_PCKs); (c) a plurality of video packs (V_PCKs); and (d) a plurality of subpicture packs (SP_PCKs). Since video information for a single frame is larger than audio information and subpicture information for a single frame, the number of video packs (V_PCKs) included in a single video object unit (VOBU) is greater than those of the audio packs (A_PCKs) and the subpicture packs (SP_PCKs).

(3) Navigation Data

The navigation data includes the video manager information (VMGI) 15 (see FIG. 2), the video title set information (VTSI) 16, data search information (DSI) 17, and presentation control information (PCI) 18. The VMGI 15 is provided at the head of the video manager (VMG) and the VTSI 16 is provided at the head of the video title set (VTS). In addition, as shown in FIG. 3, the DSI and the PCI are separately provided at the head of each video object unit (VOBU).

(4) Presentation Structure

Figure 4:
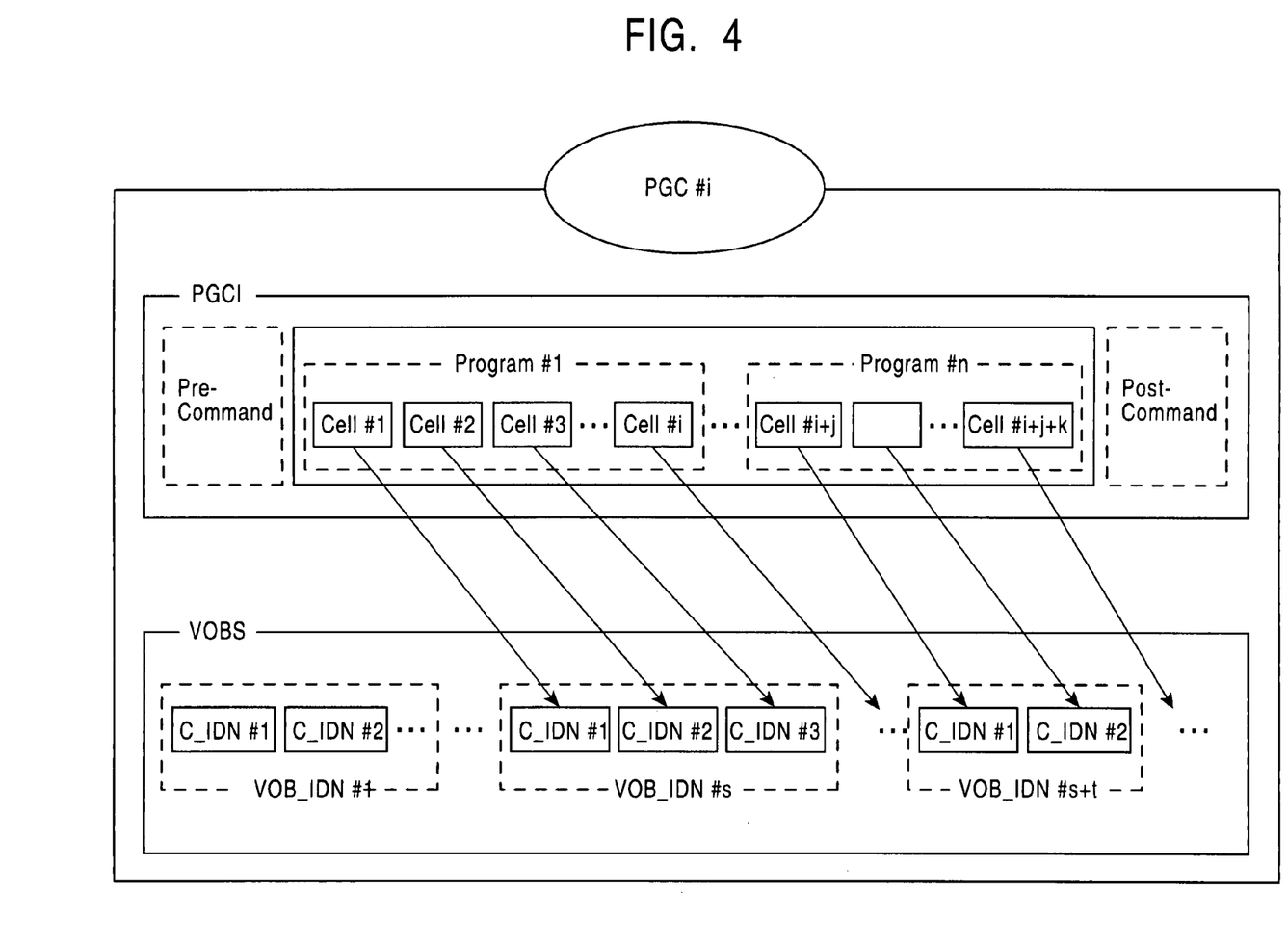
FIG. 4 is an explanatory diagram of a program chain (PGC)
Figure 5:
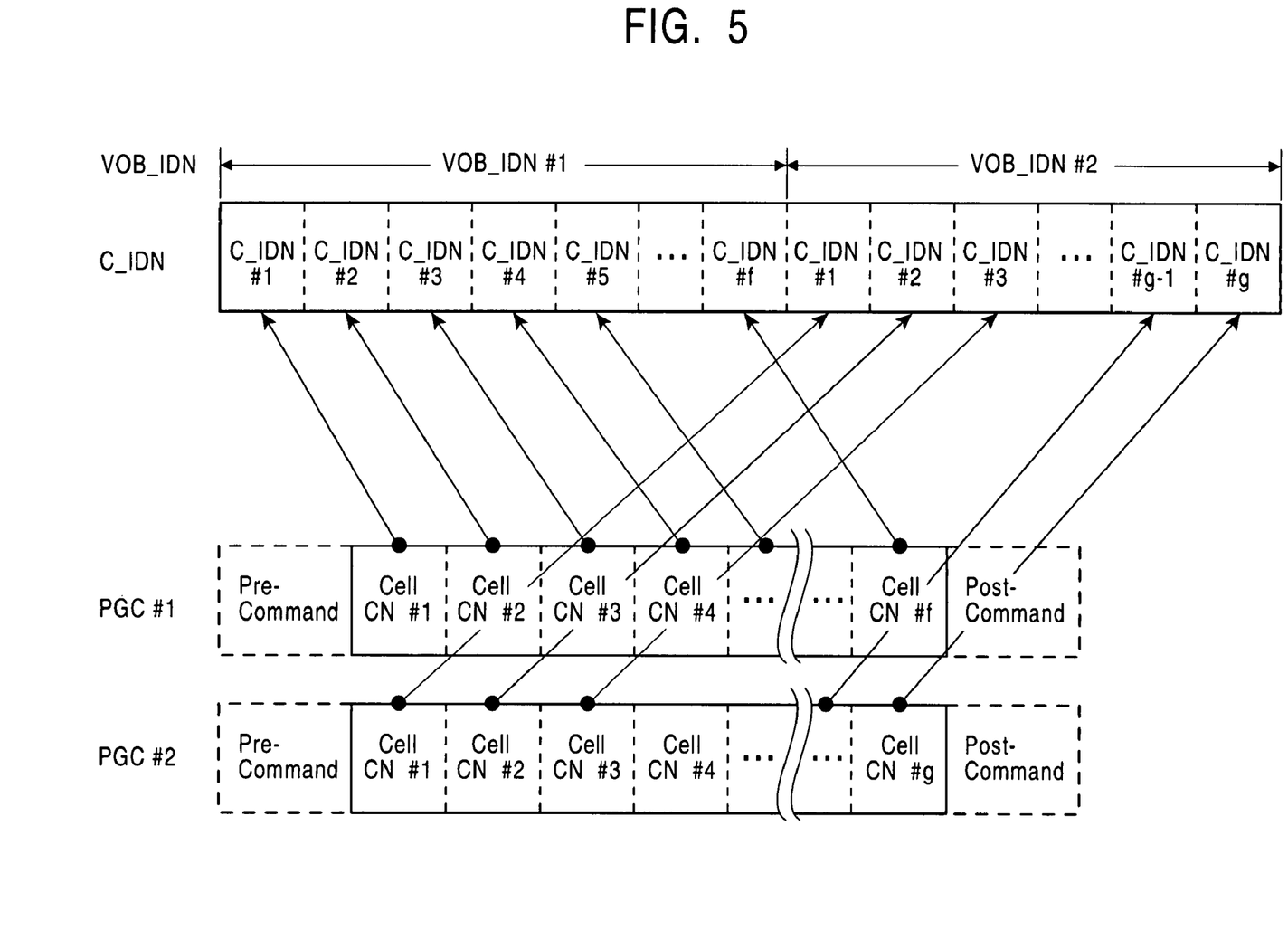
FIG. 5 is an explanatory diagram of a playback sequence of the PGC.

The presentation structure includes the titles and program chains (PGCs). As shown in FIG. 4, each PGC includes playback information called PGC information (PGCI) in which many programs are connected to each other in a chain. Cell numbers (cell #j) included in each program (program #i) correspond to cell ID numbers (C_IDNs) assigned to the cells included in the VOBS, and the cells are played back in the order of the cell numbers (cell #j). FIG. 5 is an explanatory diagram showing a playback sequence of the PGCs where the cells are successively played back.

(5) Structure of PGCI

As described above, the PGC information (PGCI) is the navigation data for controlling the presentation of the corresponding program chain (PGC). Each PGC basically includes the PGCI and the video objects (VOBs). The PGCs are classified into four types in accordance with domains they belong to: first play PGC (FP_PGC) which belongs to a first play domain (FP_DOM); video manager menu PGC (VMGM_PGC) which belongs to a video manager menu domain (VMGM_DOM); video title set menu PGC (VTSM_PGC) which belongs to a video a title set menu domain (VTSM_DOM); and title PGC (TT_PGC) which belongs to a title domain (TT_DOM).

Figure 6:
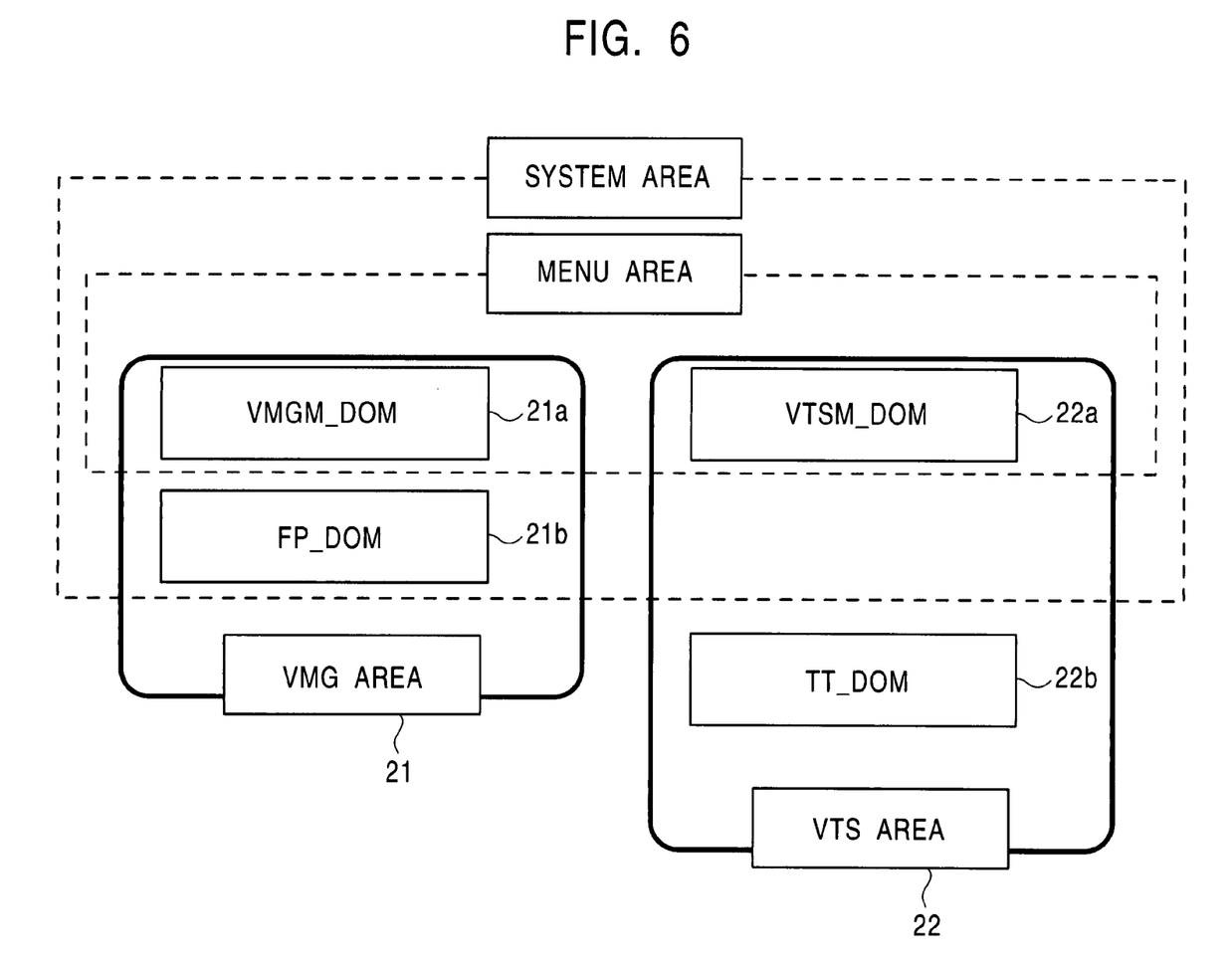
FIG. 6 is a diagram showing the relationship between areas and domains.

FIG. 6 is a diagram showing the relationship among areas and the domains. With reference to the figure, the video manager menu domain (VMGM_DOM) 21a and the first play domain (FP_DOM) 21b belong to a VMG area 21 and the video title set menu domain (VTSM_DOM) 22*a* and the title domain (TT_DOM) 22*b* belong to a VTS area 22.

In addition, a menu area consists of the video manager menu domain (VMGM_DOM) 21*a* and the video title set menu domain (VTSM_DOM) 22*a*, and a system area consists of the domains other than the title domain (TT_DOM) 22*b*.

Figure 7:
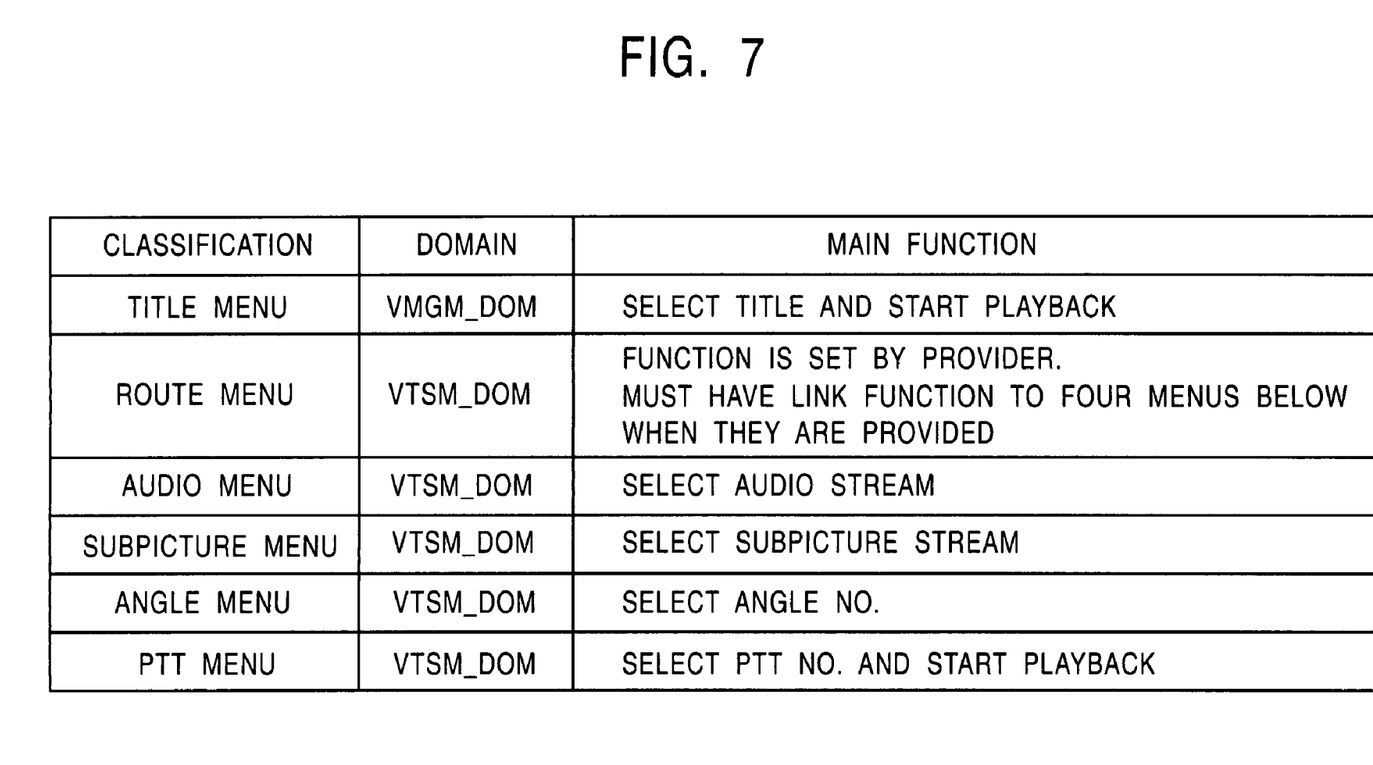
FIG. 7 is a table showing the functions of menus and domains to which the menus belong.

FIG. 7 is a table showing the functions of menus and the domains to which the menus belong. The menus consist of: (a) a title menu, (b) a route menu, (c) an audio menu, (d) a subpicture menu, (e) an angle menu, and (f) a part-of-title (PTT) menu. Since the DVD-Video disc can store up to 99 titles, the title menu is used for designating a title to be played back from among a plurality of titles recorded. The function of the route menu is set arbitrarily by a content provider, but the route menu must have a link function to the menus of items (c) to (f) above. The audio menu is used for selecting an audio stream (audio track), the subpicture menu is for selecting a subpicture from among a plurality of subpictures, the angle menu is for selecting an angle number, that is, for selecting a video to be played back from among videos taken from different angles, and the PTT menu is for selecting a PTT number for PTT search.

Only the title menu belongs to the video manager menu domain (VMGM_DOM) 21*a*. The other menus, that is, the route menu, the audio menu, the subpicture menu, the angle menu, and the PTT menu, belong to the video title set menu domain (VTSM_DOM) 22*a*.

C) Method for Detecting the Data Portion DP

According to the data portion DP in which playback does not start unless some kind of operation is performed, the menu screen is shown on a display unit and playback of the titles (main program) is not performed unless it is commanded by a menu-selection operation. Accordingly, playback of the titles (main program) is started when it is commanded. In the DVD-Video disc, the data portion DP belongs to the menu area. However, since the menu screen can be set outside the menu area, two types of detection methods are applied, one for the menu area and the other for the area outside the menu area.

(1) Detection During Playback of VMGM_DOM or VTSM_DOM (During Playback of Menu Area)

Figure 8:
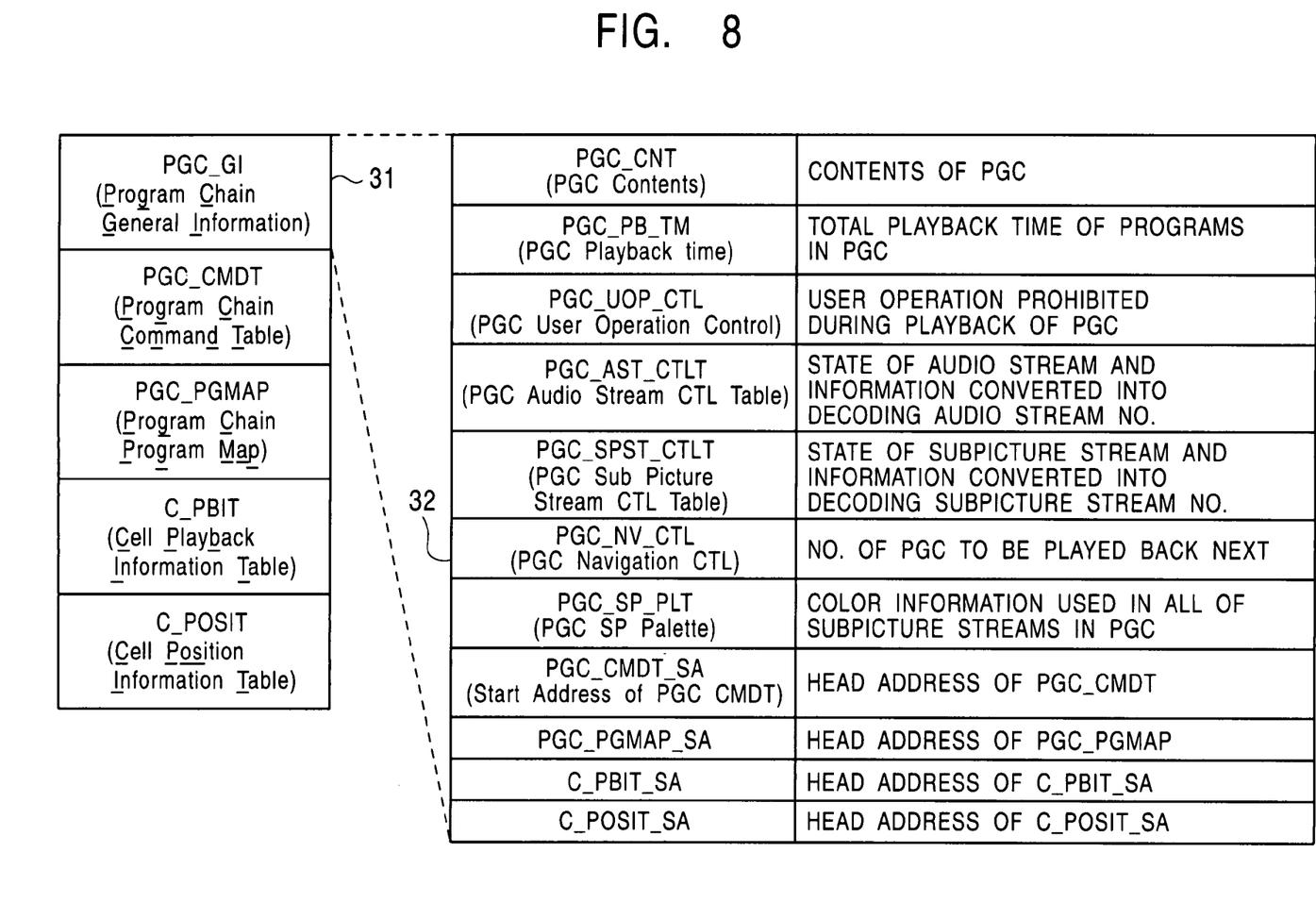
FIG. 8 is an explanatory diagram showing the structure of a program chain information (PGCI)
Figure 9:
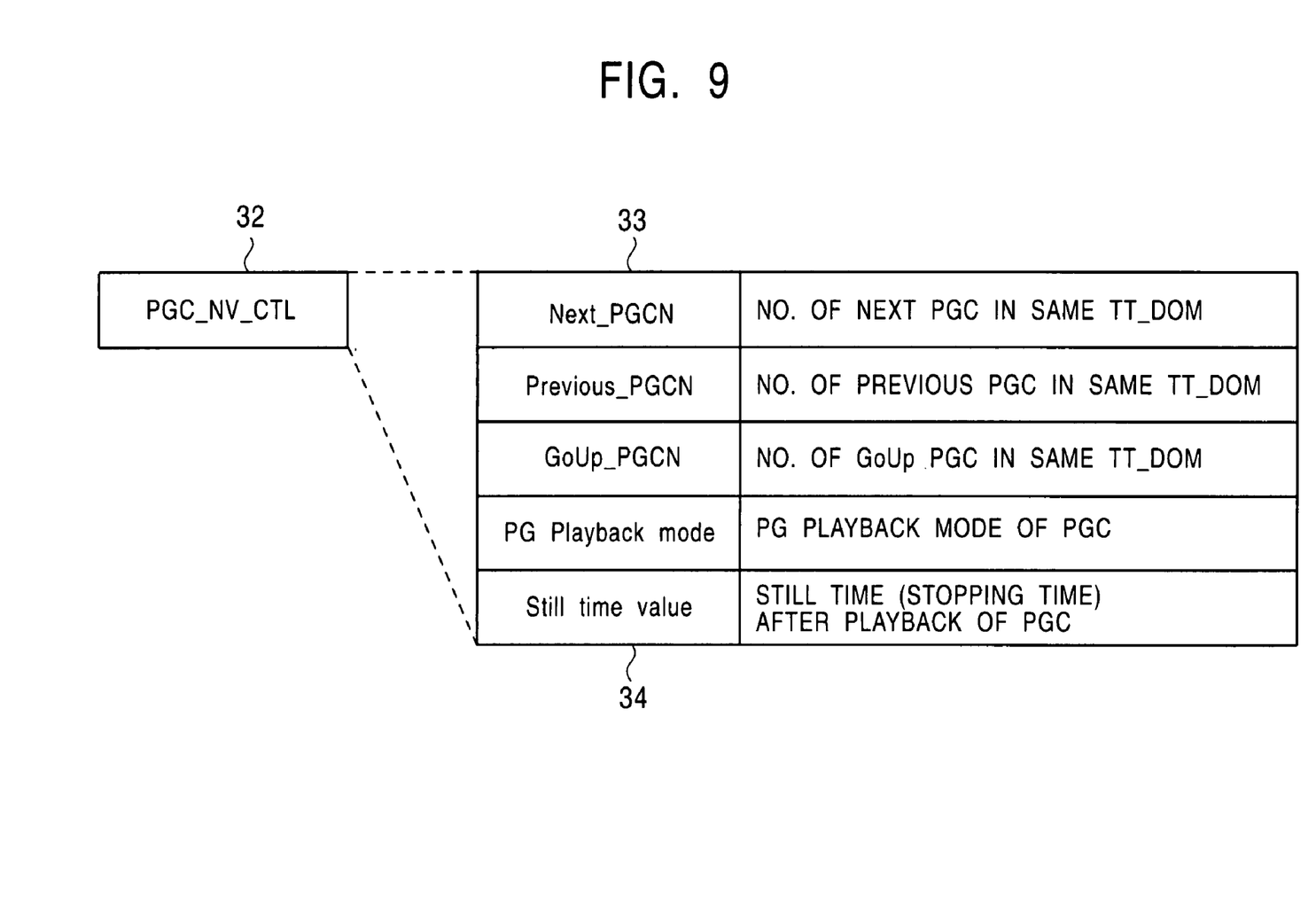
FIG. 9 is an explanatory diagram of PGC navigation control (PGC_NV_CTL)

FIG. 8 shows the structure of the program chain information (PGCI). In the program chain information (PGCI), program chain general information (PGC_GI) 31 includes PGC navigation control (PGC_NV_CTL) 32 which indicates the number of the PGC to be played back next after the current PGC. With reference to FIG. 9, the PGC navigation control (PGC_NV_CTL) 32 includes five items. Among the five items, Next_PGCN 33 indicates the number of the PGC next to the current PGC in the same title domain (TT_DOM) 22*b*, and still time value 34 indicates a still time (stopping time) after the current PGC is played back.

(i) When the number of the PGC which is currently being played back (current PGN) is set as the Next_PGCN 33 in the PGCI, that is, when the number of the PGC to be played back next after the PGC which is currently being played back in the menu area is the number of the PGC which is currently being played back (current PGN), no other PGCs can be played back afterwards (this state is called an endless loop). Accordingly, the current PGN set as the Next_PGCN 33 serves as the data portion DP in which playback does not start unless some kind of operation is performed.

(ii) When "0000h" (h means "hexa") is set as the Next_PGCN 33 in the PGCI, it means that no PGC is to be played back next and "255" (infinite still) is set as the still time value 34 in the PGCI. Accordingly, when the still time value 34 in the PGCI is "255" (infinite still), the still time (stopping time) is infinite and no PGC can be played back afterwards. Thus, the value of "255" set as the still time value 34 serves as the data portion DP in which playback does not start unless some kind of operation is performed.

Accordingly, the above-described endless loop and infinite still time mean that playback of the next PGC cannot be started unless some kind of operation is performed and that some kind of user operation is required. Therefore, it can be determined that the current screen is the menu screen when the Next_PGCN 33 is the current PGN or when the still time value 34 is "255" (infinite still).

(2) Detection During Playback of TT_DOM (During Playback of Main Program)

(i) Similar to the detection during playback of the menu area, also when the main program is played back, playback stops forever after the current PGC when "255" (infinite still) is set as the still time value 34 in the PGCI. Accordingly, the value of "255" set as the still time value 34 serves as the data portion DP in which playback does not start unless some kind of operation is performed.

(ii) When one or more items of button information are displayed on the screen while the main program is being played back, they serve as the data portion DP in which playback does not start unless some kind of operation is performed.

Figure 10:
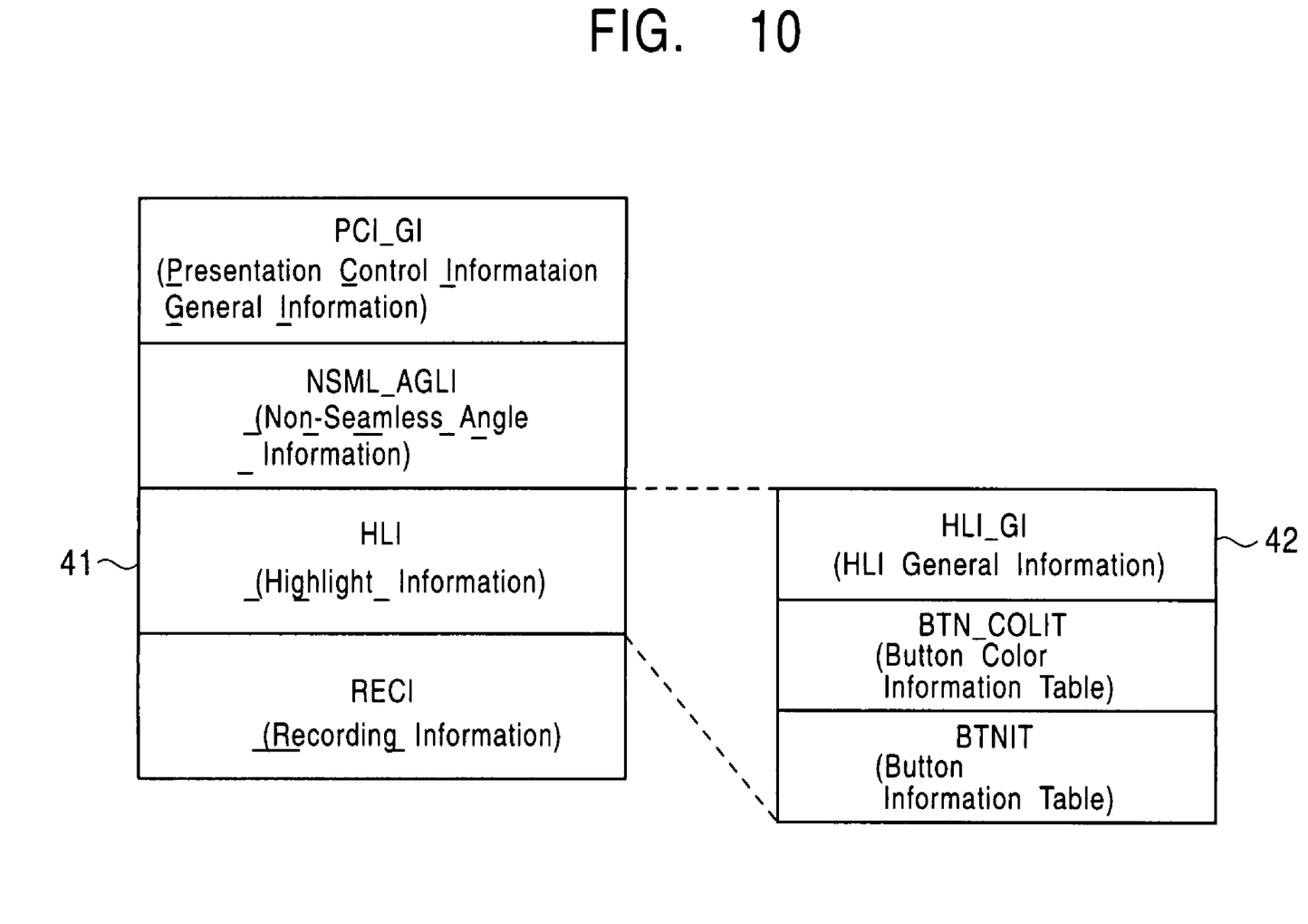
FIG. 10 is an explanatory diagram of presentation control information (PCI)

The presentation control information (PCI) is the navigation data for controlling the corresponding VOB unit (VOBU) (see FIG. 3). As shown in FIG. 10, the PCI includes four kinds of information: PCI general information (PCI_GI), non-seamless angle information (NSML_AGLI), highlight information (HLI), and recording information (RECI). The highlight information (HLI) 41 is used for highlighting a rectangular area in a subpicture display area, and includes three items: HLI general information (HLI_GI) 42, a button color information table (BTN_COLIT), and a button information table (BTNIT).

Figure 11:
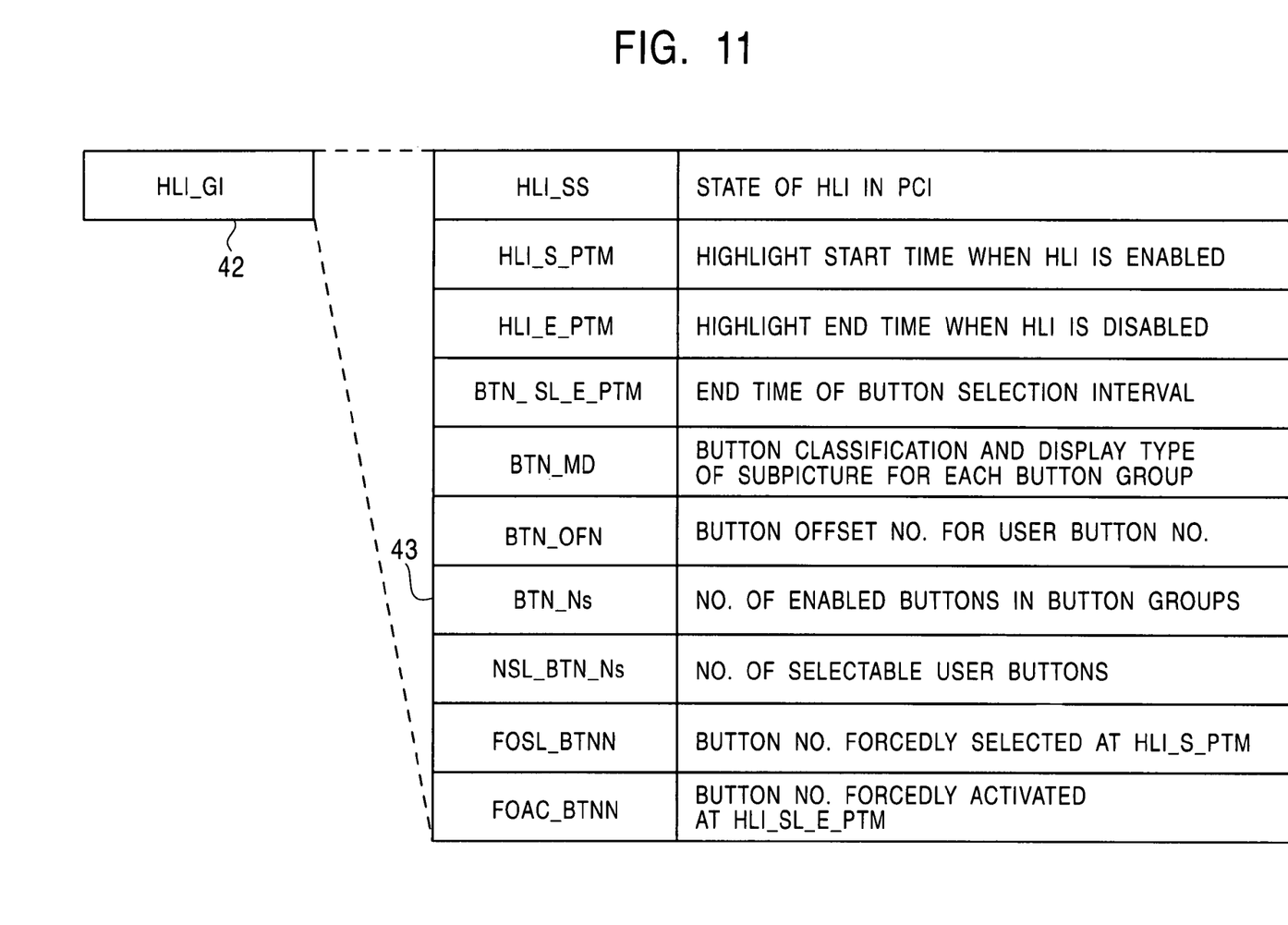
FIG. 11 is an explanatory diagram of highlight general information (HLI_GI)

As shown in FIG. 11, the HLI general information (HLI_GI) 42 includes BTN_Ns 43 which indicates the number of buttons which are currently enabled. When one or more buttons are enabled, it means that a selection operation is possible. Accordingly, it can be determined that the current screen is the menu screen when the BTN_Ns is one or more.

In this case, it is determined that some kind of user operation is required, that is, that playback is not started unless some kind of operation is performed, and detection is performed by a system controller which will be described below.

D) Construction of DVD-Video Playback Apparatus

Figure 12:
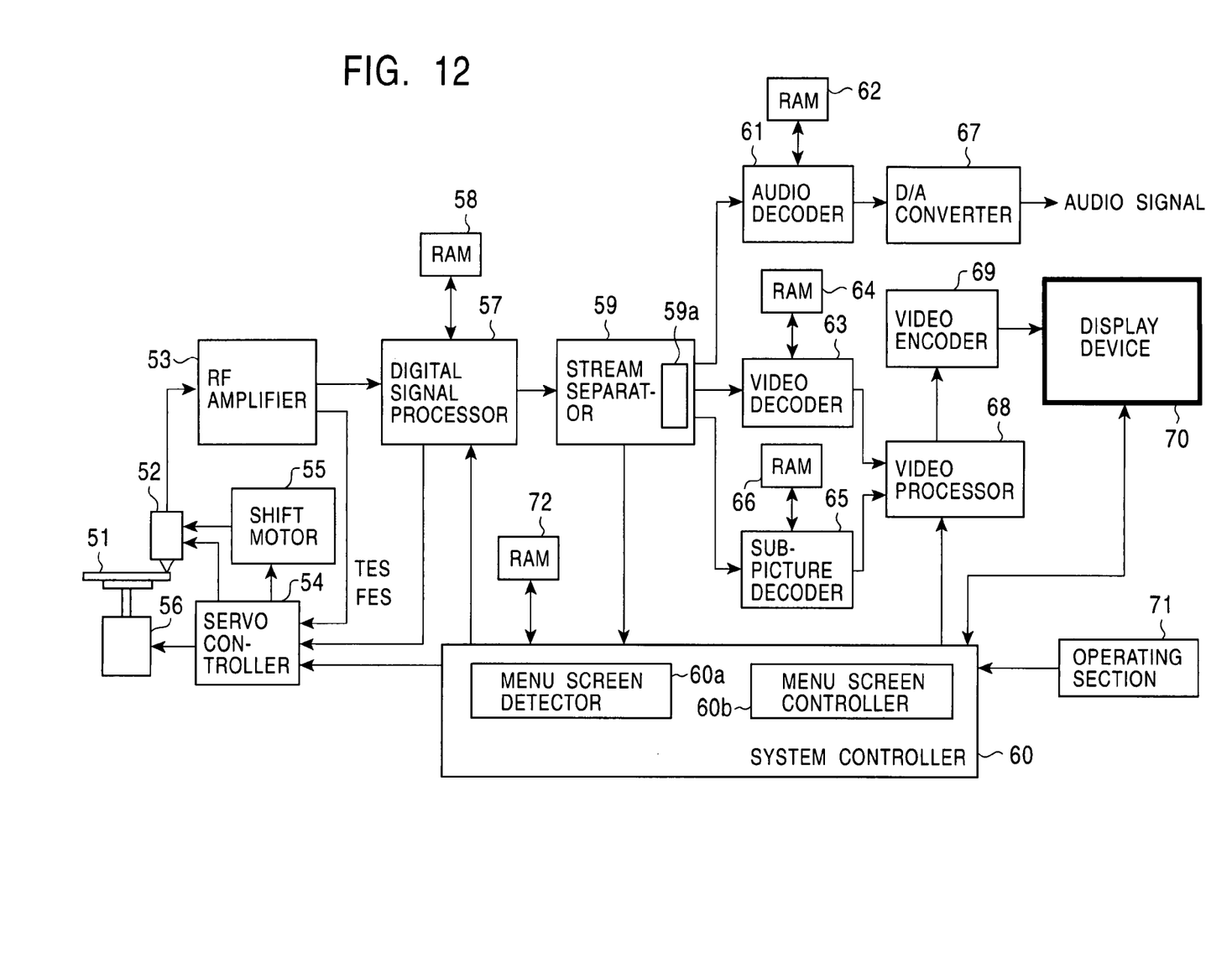
FIG. 12 is a diagram showing the overall construction of a DVD-Video playback apparatus.

FIG. 12 is a diagram showing the overall construction of a DVD-Video playback apparatus. A signal is read from a DVD-Video disc 51 by an optical pickup 52 and is supplied to a radio-frequency (RF) amplifier 53. The RF amplifier 53 amplifies the input signal and provides the amplified signal to a digital signal processor 57. In addition, the RF amplifier 53 generates a tracking error signal (TES) and a focusing error signal (FES) and transmits the generated signals to a servo controller 54. The servo controller 54 performs tracking servo control by driving a shift motor 55 using the tracking error signal TES. In addition, the servo controller 54 moves the optical pickup 52 to a predetermined position in the radial direction of the disc on the basis of commands from a system controller 60. The servo controller 54 also performs focus servo control such that the focal point of the optical pickup 52 is on the disc surface by driving an actuator using the focusing error signal (FES). In addition, the servo controller 54 rotates a spindle motor 56 at a constant rotational speed.

The digital signal processor 57 performs a demodulation process of DVD modulation signals, an error correction process, a digital authentication process, a process of transmitting a bit stream (DVD data) in response to a data transmission request from the MPEG decoder, etc., using a random access memory (RAM) 58. A stream separator 59 separates the navigation pack (NV_PCK), analyzes the DVD data stream, and supplies as outputs: (a) main video data corresponding to a selected title, (b) subpicture data of a selected language, and (c) audio data of a selected language separately from each other. The stream separator 59 includes a detector 59a which detects when the menu screen is being displayed by the four methods described above in Section C) and provides the detection result to the system controller 60.

The system controller 60 controls each of the components and performs the blackout function using a menu-screen-display signal received from the detector 59a of the stream separator 59 in accordance with an operational flow which will be described below. In addition, the system controller 60 includes a menu screen detector 60a which determines whether or not the current screen is the menu screen and a menu screen controller 60b which turns on the display of a display unit so that the menu screen appears if the current screen is determined to be the menu screen while display-off is set by an operating section 71 which will be described below.

An audio decoder 61 decodes MPEG audio data using a RAM 62 to obtain PCM audio data, a video decoder 63 decodes MPEG video data of the main video using a RAM 64, and a subpicture decoder 65 decodes MPEG video data of the subpicture using a RAM 66. A D/A converter 67 converts the PCM audio data into analog data and provides an output of the obtained analog data. A video processor 68 edits the main video and the subpicture and supplies them to a video encoder 69. The video encoder 69 encodes the video signal from the video processor 68 to a signal of either the NTSC standard or the PAL standard and supplies the obtained signal to a display device 70 which serves as the display unit. The display device 70 displays the video supplied thereto on a display screen. The on/off state of the display of the display device 70 is controlled by the system controller 60 on the basis of the blackout function. The operating section 71 is used for the playback operation of the DVD-Video disc and for providing the enabled/disabled state of the blackout function to the system controller 60.

E) Blackout Process

Figure 13:
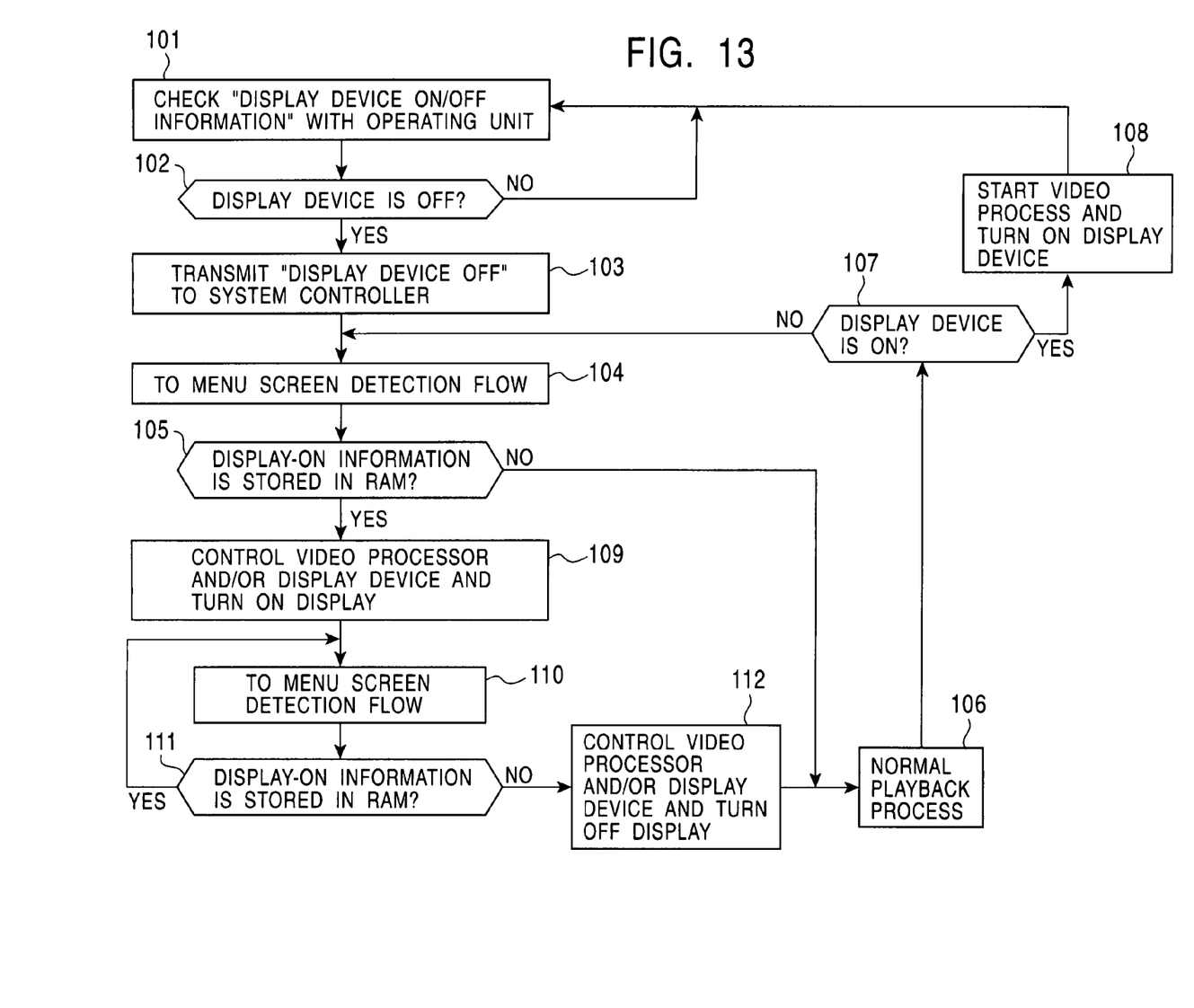
FIG. 13 is a flowchart of a blackout control process.

FIG. 13 is a flowchart of a blackout control process. The operating section 71 checks whether or not the display of the display device is turned off by a key operation, that is, whether or not the blackout function is enabled (Steps 101 and 102). If the display is turned off and the blackout function is enabled, a command to start the blackout function is issued to the system controller 60. When the blackout function is enabled, the system controller 60 stops the video process of the video processor 68 and turns off the display device 70 (Step 103).

Then, the system controller 60 checks whether or not a display-on command is stored in a RAM 72 on the basis of the result of a menu-screen-detection process performed by the stream separator 59 (Steps 104 and 105). The menu-screen-detection process performed by the stream separator 59 will be described below with reference to a flowchart shown in FIG. 14.

When it is determined that the display-on command is not issued in Step 105, normal processes are continued (Step 106) and it is determined whether or not the blackout function is enabled by the operating section 71 (Step 107). If the blackout function is enabled, the process returns to Step 104 and the subsequent steps are repeated. If the blackout function is finished by the key operation of the operating section 71, the system controller 60 starts the video process of the video processor 68 and turns on the display device 70 (Step 108). Then, the process returns to Step 101 and the subsequent steps are repeated.

When the menu screen is detected by the stream separator 59 in Step 105 and the display-on command is issued, the system controller 60 issues a command to start the video process to the video processor 68 and a command to turn on the display to the display device 70 so that the menu screen is shown thereon (Step 109).

Then, the system controller 60 checks whether the display-on command is still stored in the RAM 72 (Steps 110 and 111). When the display-on command is stored, it means that the menu screen is being displayed. Accordingly, the process returns to Step 110 and the display is continuously turned on.

When a display-off command is stored in the RAM 72, it means that the user has performed a menu-selection operation and the menu screen has disappeared. Accordingly, the system controller 60 stops the video process of the video processor 68 and turns off the display of the display device 70 (Step 112). Then, Step 106 and the subsequent steps are performed. More specifically, if the menu screen is detected by the stream separator 59 again while the blackout function is enabled (the result of Step 107 is NO) and the display-on command is set in the RAM 72 (the result of Step 105 is YES), the display is turned on so that the menu screen appears (Step 109) and the subsequent steps are repeated.

Thus, the sound quality can be improved when the display is turned off by the blackout function, and the display can be automatically turned on so that the menu screen appears when the menu-selection operation is required. Accordingly, the user can perform menu selection and playback can be continued.

Figure 14:
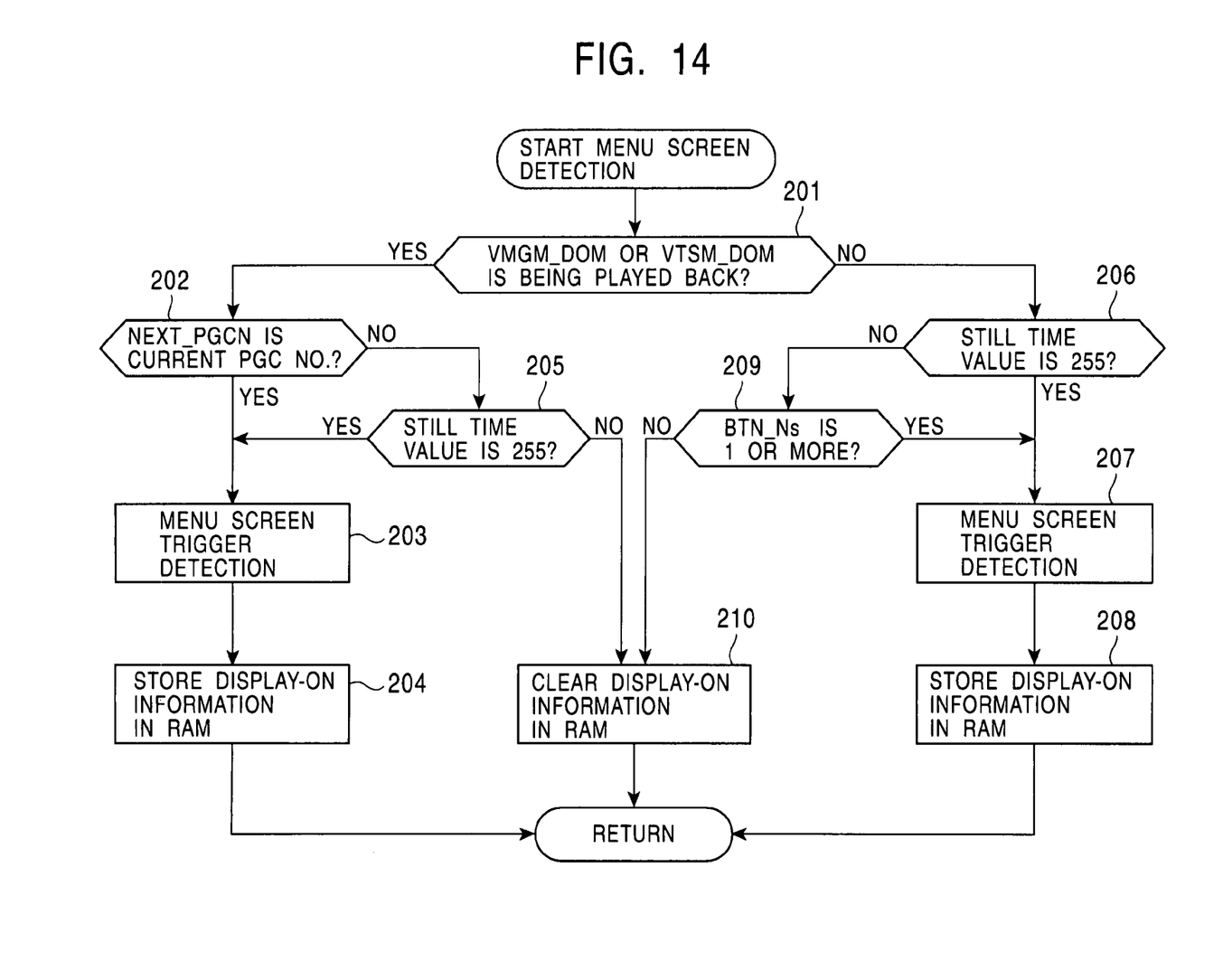
FIG. 14 is a flowchart of a menu-screen-detection process.

FIG. 14 is a flowchart of the menu-screen-detection process performed by the detector 59a included in the stream separator 59.

The detector 59a of the stream separator 59 refers to the navigation data and checks whether or not one of the domains in the menu area (VMGM_DOM or VTSM_DOM) is being played back (Step 201). When one of the domains in the menu area is being played back, it is determined whether or not the Next_PGCN 33 (see FIG. 9) is the number of the current PGC (Step 202). If the Next_PGCN 33 is the number of the current PGC, it is determined that the current screen is the menu screen (Step 203). Accordingly, the display-on command is set in the RAM 72 (Step 204) and the process returns to the start.

When it is determined that the Next_PGCN 33 is not the number of the current PGC in Step 202, it is determined whether or not the still time value 34 (see FIG. 9) is "255" (Step 205). If the still time value 34 is "255", it is determined that the current screen is the menu screen (Step 203). Accordingly, the display-on command is set in the RAM 72 (Step 204) and the process returns to the start. If the still time value 34 is not "255", the display-off command is set in the RAM 72 (Step 210) and the process returns to the start.

If it is determined that neither one of the domains of the menu area is being played back in Step 201, it is determined whether or not the still time value 34 (see FIG. 9) is "255" (Step 206). If the still time value 34 is "255", it is determined that the current screen is the menu screen (Step 207). Accordingly, the display-on command is set in the RAM 72 (Step 208) and the process returns to the start. If the still time value 34 is not "255", it is determined whether or not the BTN_Ns 43 (see FIG. 11) is 1 or more (Step 209). If the BTN_Ns 43 is 1 or more, it is determined that the current screen is the menu screen (Step 207). Accordingly, the display-on command is set in the RAM 72 (Step 208) and the process returns to the start.

If the BTN_Ns 43 is not 1 or more, that is, when the BTN_Ns 43 is 0, the display-off command is set in the RAM 72 (Step 210) and the process returns to the start.

What is claimed is:

1. A video playback apparatus which plays back audio and video on the basis of signals recorded on a recording medium, the video playback apparatus comprising:
    a unit for producing an audio signal for playing back audio on the basis of the recorded signals;
    a display unit for displaying a video screen and a menu screen on the basis of the recorded signals;
    an operating unit for setting a display off state for the display unit whereby the display unit is turned off during the playback of the recorded signals so that only audio is played back;
    a menu screen detector which analyzes data read from the recording medium and determines during playback whether or not a current screen is a menu screen on the basis of the signals recorded on the recording medium; and
    a menu screen controller configured to, when the display unit is off and in response to a determination by the menu screen detector that the current screen is a menu screen, automatically turn on the display of the display unit and cause the menu screen to be displayed on the display unit.

2. A video playback apparatus according to claim 1, wherein the menu screen controller turns off the display of the display unit when the current screen is no longer a menu screen.

3. A video playback apparatus according to claim 1, wherein the menu screen detector determines whether or not the current screen is a menu screen by referring to navigation data recorded on the recording medium.

4. A video playback apparatus according to claim 1, wherein the menu screen controller turns on the display of the display unit so that the menu screen appears when the current screen is determined to be a menu screen, and then turns off the display of the display unit when a menu operation corresponding to the menu screen is performed through the operating unit.

5. A video playback apparatus according to claim 3, wherein the menu screen detector determines that the current screen is a menu screen when the number of a program chain to be played back next is the number of a program chain which is currently being played back, the number of the program chain to be played back next being included in the navigation data.

6. A video playback apparatus according to claim 3, wherein the menu screen detector determines that the current screen is a menu screen when a still time included in the navigation data is infinite.

7. A video playback apparatus according to claim 3, wherein the menu screen detector determines that the current screen is a menu screen when the number of buttons is one or more, the number of buttons being included in highlight information of the navigation data.

8. A video playback apparatus according to one of claims 1 and 2, further comprising a video processor which performs a video process, wherein the menu screen controller turns on or off the display of the display unit by starting or stopping the operation of the video processor.

9. A video playback apparatus according to one of claims 1 and 4, wherein the recording medium is a DVD-Video disc.

10. A display control method for a video playback apparatus which plays back audio and video on the basis of signals recorded on a recording medium, the method comprising:
    reading the signals recorded on the recording medium;
    producing an audio signal for playing back audio on the basis of the recorded signals;
    receiving an operation setting a display off state whereby a display unit of the video playback apparatus is turned off during the playback of the recorded signals so that only audio is played back;
    determining during playback whether or not a current screen is a menu screen on the basis of the signals recorded on the recording medium; and
    when the display unit is off and in response to a determination that the current screen a menu screen, automatically turning on the display unit to cause the display of the menu screen.

11. A display control method for the video playback apparatus according to claim 10, wherein the display of the display unit is turned off when the current screen is no longer a menu screen.

12. A display control method for the video playback apparatus according to claim 10, wherein whether or not the current screen is a menu screen is determined by referring to navigation data recorded on the recording medium.

13. A display control method for the video playback apparatus according to claim 10, wherein the display of the display unit is turned on so that the menu screen appears when the current screen is determined to be a menu screen, and is then turned off when a menu operation corresponding to the menu screen is performed.

14. A display control method for the video playback apparatus according to claim 12, wherein it is determined that the current screen is a menu screen when the number of a program chain to be played back next is the number of a program chain which is currently being played back, the number of the program chain to be played back next being included in the navigation data.

15. A display control method for the video playback apparatus according to claim 12, wherein it is determined that the current screen is a menu screen when a still time included in the navigation data is infinite.

16. A display control method for the video playback apparatus according to claim 12, wherein it is determined that the current screen is a menu screen when the number of buttons is one or more, the number of buttons being included in highlight information of the navigation data.

17. A display control method for the video playback apparatus according to one of claims 10 and 13, wherein the recording medium is a DVD-Video disc.

18. A method of operating a video playback apparatus, comprising:
    providing a recording medium on which are recorded signals for playing back audio and video, and data indicating whether a menu screen is to be displayed on a display unit of the video playback apparatus;
    reading the signals recorded on the recording medium;
    producing an audio signal for playing back audio on the basis of the recorded signals;
    receiving an operation setting a display off state whereby the display unit is turned off during the playback of the recorded signals so that only audio is played back;
    determining during playback whether a menu screen is to be displayed on the basis of said data; and
    automatically displaying a menu screen on the display unit in response to said determination when said data indicates the menu screen is to be displayed, and not displaying video when said data indicates otherwise.

* * * * *